United States Patent
Tobin

(10) Patent No.: US 10,551,115 B2
(45) Date of Patent: Feb. 4, 2020

(54) SYSTEM AND METHOD FOR REDUNDANT POWER SUPPLY TRANSPORT CONTAINER

(71) Applicant: Kevin G. Tobin, Gloucester, MA (US)

(72) Inventor: Kevin G. Tobin, Gloucester, MA (US)

( * ) Notice: Subject to any disclaimer, the term of this patent is extended or adjusted under 35 U.S.C. 154(b) by 101 days.

(21) Appl. No.: 15/588,960

(22) Filed: May 8, 2017

(65) Prior Publication Data

US 2017/0321961 A1 Nov. 9, 2017

Related U.S. Application Data

(60) Provisional application No. 62/332,723, filed on May 6, 2016.

(51) Int. Cl.
*F25D 29/00* (2006.01)

(52) U.S. Cl.
CPC .................. *F25D 29/003* (2013.01)

(58) Field of Classification Search
CPC .. F25B 49/005; F25D 2400/361; F25D 29/00; F25D 29/003; H02J 9/06
USPC .......................................................... 62/131
See application file for complete search history.

(56) References Cited

U.S. PATENT DOCUMENTS

| | | | | |
|---|---|---|---|---|
| 3,602,730 A * | 8/1971 | Cushing | ............... | B63B 25/004 114/72 |
| 4,081,999 A * | 4/1978 | Lenken | .................... | G01K 3/00 116/221 |
| 6,260,360 B1 * | 7/2001 | Wheeler | ................... | A01N 1/02 62/3.6 |
| 2002/0108725 A1 * | 8/2002 | Nelson | ................ | B29C 33/0011 160/351 |
| 2003/0163998 A1 * | 9/2003 | Goth | .................. | H05K 7/20381 62/131 |
| 2004/0090950 A1 * | 5/2004 | Lauber | ..................... | H04Q 9/00 370/352 |
| 2004/0194498 A1 * | 10/2004 | Burchill | .................. | F25B 49/02 62/513 |
| 2012/0031345 A1 * | 2/2012 | Rosenstein | .......... | A01K 1/0052 119/408 |
| 2012/0227427 A1 * | 9/2012 | Liu | ........................... | F25B 1/10 62/115 |
| 2013/0262197 A1 * | 10/2013 | Kaulgud | ................ | G05B 13/02 705/14.1 |

(Continued)

*Primary Examiner* — Henry T Crenshaw
(74) *Attorney, Agent, or Firm* — Michael T. Abramson; Holland & Knight LLP

(57) ABSTRACT

An apparatus, method, computer program product, and computer system for monitoring at least one of an environment of at least one freezer unit of one or more freezer units inside a mobile container and a macro environment of the mobile container maintained by a refrigeration unit. Data of at least one of the macro environment of the mobile container and the environment of the at least one freezer unit may be logged. The data may be provided to an external display. An alert may be provided in real-time to the external display based upon, at least in part, at least one of the macro environment of the mobile container and the environment of the at least one freezer unit. A first power supply providing power to the at least one freezer unit may be switched to a second power supply providing power to the at least one freezer unit based upon, at least in part, at least one of the macro environment of the mobile container and the environment of the at least one freezer unit.

17 Claims, 4 Drawing Sheets

(56) References Cited

U.S. PATENT DOCUMENTS

| | | | |
|---|---|---|---|
| 2014/0060097 A1* | 3/2014 | Perreault | B60H 1/00378 62/133 |
| 2015/0033775 A1* | 2/2015 | Cohen | F25D 29/003 62/89 |
| 2015/0168032 A1* | 6/2015 | Steele | B60P 3/20 62/61 |
| 2015/0198938 A1* | 7/2015 | Steele | G05B 15/02 700/275 |
| 2016/0238406 A1* | 8/2016 | Burtner | G06F 16/22 |

* cited by examiner

SYSTEM AND METHOD FOR REDUNDANT POWER SUPPLY TRANSPORT CONTAINER

RELATED CASES

This application claims the benefit of U.S. Provisional Application No. 62/332,723, filed on 6 May 2016, the contents of which are all incorporated by reference.

BACKGROUND

Generally, research (e.g., clinical and basic scientific) may generate samples critical to discovery process. These samples may be both biological, chemical, or otherwise, and may require "freezer" (or incubator) storage at a particular facility. Freezers of various temperatures are generally the repositories for these samples in the facility. Temperatures in the freezers may range from, e.g., −196 degrees centigrade to 60 degrees centigrade. In some situations, the samples may be obtained at one location (e.g., the facility), and transported to another geographic location, e.g., for analysis or storage. Since the microenvironment needed to maintain the sample's integrity (as well as other regulatory requirements) may be sensitive, transportation of the freezer units (with the samples inside) may be best practice.

BRIEF SUMMARY OF DISCLOSURE

In one example implementation, a method, performed by one or more computing devices, may include but is not limited to monitoring at least one of an environment of at least one freezer unit of one or more freezer units inside a mobile container and a macro environment of the mobile container maintained by a refrigeration unit. Data of at least one of the macro environment of the mobile container and the environment of the at least one freezer unit may be logged. The data may be provided to an external display. An alert may be provided in real-time to the external display based upon, at least in part, at least one of the macro environment of the mobile container and the environment of the at least one freezer unit. A first power supply providing power to the at least one freezer unit may be switched to a second power supply providing power to the at least one freezer unit based upon, at least in part, at least one of the macro environment of the mobile container and the environment of the at least one freezer unit.

One or more of the following example features may be included. The alert may be further provided based upon, at least in part, reaching a threshold temperature value associated with the environment of the at least one freezer unit. Power, received from a power source external to the mobile container, may be provided to the at least one freezer unit electrically coupled to at least one power distribution portion via an outlet electrically coupled to at least one power distribution portion. Switching to the second power supply may be automatic based upon, at least in part, a failure of the first power supply. Switching to the second power supply may be automatic based upon, at least in part, the environment of the at least one freezer unit. Switching to the second power supply may be manual. The mobile container may include a trailer.

In another example implementation, a computer program product may reside on a computer readable storage medium having a plurality of instructions stored thereon which, when executed across one or more processors, may cause at least a portion of the one or more processors to perform operations that may include but are not limited to monitoring at least one of an environment of at least one freezer unit of one or more freezer units inside a mobile container and a macro environment of the mobile container maintained by a refrigeration unit. Data of at least one of the macro environment of the mobile container and the environment of the at least one freezer unit may be logged. The data may be provided to an external display. An alert may be provided in real-time to the external display based upon, at least in part, at least one of the macro environment of the mobile container and the environment of the at least one freezer unit. A first power supply providing power to the at least one freezer unit may be switched to a second power supply providing power to the at least one freezer unit based upon, at least in part, at least one of the macro environment of the mobile container and the environment of the at least one freezer unit.

One or more of the following example features may be included. The alert may be further provided based upon, at least in part, reaching a threshold temperature value associated with the environment of the at least one freezer unit. Power, received from a power source external to the mobile container, may be provided to the at least one freezer unit electrically coupled to at least one power distribution portion via an outlet electrically coupled to at least one power distribution portion. Switching to the second power supply may be automatic based upon, at least in part, a failure of the first power supply. Switching to the second power supply may be automatic based upon, at least in part, the environment of the at least one freezer unit. Switching to the second power supply may be manual. The mobile container may include a trailer.

In another example implementation, an apparatus may include but is not limited to a mobile container. The mobile container may include at least one power distribution portion. The mobile container may further include a plurality of power supplies electrically coupled to the at least one power distribution portion, wherein a first power supply of the plurality of power supplies may be configured to provide power to at least one freezer unit of one or more freezer units electrically coupled to the at least one power distribution portion. The mobile container may further include a monitoring system configured to monitor an environment of the at least one freezer unit of the one or more freezer units.

One or more of the following example features may be included. The monitoring system may be further configured to monitor a macro environment of the mobile container maintained by a refrigeration unit. The monitoring system may be further configured to log data of at least one of the macro environment of the mobile container and the environment of the at least one freezer unit. The monitoring system may be further configured to provide an alert in real-time to an external display based upon, at least in part, reaching a threshold temperature value associated with the environment of the at least one freezer unit. The monitoring system may be further configured to provide the data to an external display. The mobile container may further comprise an outlet electrically coupled to the at least one power distribution portion, wherein the outlet may be configured to receive a power source external to the mobile container to provide power to the at least one freezer unit electrically coupled to the at least one power distribution portion. The mobile container may further comprise a switch electrically coupled to the at least one power distribution portion, wherein the switch may be configured to switch from the first power supply to a second power supply of the plurality of power supplies configured to provide power to the at least one freezer unit. The switch may be configured to automatically switch to the second power supply based upon, at least in part, a failure of the first power supply. The switch may be configured to automatically switch to the second power supply based upon, at least in part, the environment of the at least one freezer unit. The switch may be configured to manually switch to the second power supply. The mobile container may further comprise an insulated partition wall between the plurality of power supplies and the at least one power distribution portion. The mobile container may include a trailer.

In another example implementation, an apparatus may include but is not limited to a mobile container. The mobile container may further include at least one power distribution portion. The mobile container may further include a plurality of power supplies electrically coupled to the at least one power distribution portion, wherein a first power supply of the plurality of power supplies may be configured to provide power to at least one freezer unit of one or more freezer units electrically coupled to the at least one power distribution portion. The mobile container may further include a monitoring system configured to monitor an environment of the at least one freezer unit, wherein the monitoring system may be further configured to log data of the environment of the at least one freezer unit, and wherein the monitoring system may be further configured to provide an alert in real-time to an external display based upon, at least in part, reaching a threshold temperature value associated with the environment of the at least one freezer unit.

One or more of the following example features may be included. The monitoring system may be further configured to monitor a macro environment of the mobile container maintained by a refrigeration unit. The monitoring system may be further configured to log data of the macro environment of the mobile container. The monitoring system may be further configured to provide the data of the macro environment of the mobile container and the data of the environment of the at least one freezer unit to an external display. The mobile container may further comprise an outlet electrically coupled to the at least one power distribution portion, wherein the outlet may be configured to receive a power source external to the mobile container to provide power to the at least one freezer unit electrically coupled to the at least one power distribution portion. The mobile container may further comprise a switch electrically coupled to the at least one power distribution portion, wherein the switch may be configured to switch from the first power supply to a second power supply of the plurality of power supplies configured to provide power to the at least one freezer unit. The switch may be configured to automatically switch to the second power supply based upon, at least in part, at least one of a failure of the first power supply and the environment of the at least one freezer unit. The mobile container may include a trailer.

In another example implementation, an apparatus may include but is not limited to a mobile container. The mobile container may include at least one power distribution portion. The mobile container may further include a plurality of power supplies electrically coupled to the at least one power distribution portion, wherein a first power supply of the plurality of power supplies may be configured to provide power to at least one incubator unit of one or more incubator units electrically coupled to the at least one power distribution portion. The mobile container may further include a monitoring system configured to monitor an environment of the at least one incubator unit of the one or more incubator units.

One or more of the following example features may be included. The monitoring system may be further configured to monitor a macro environment of the mobile container maintained. The monitoring system may be further configured to log data of at least one of the macro environment of the mobile container and the environment of the at least incubator freezer unit. The monitoring system may be further configured to provide an alert in real-time to an external display based upon, at least in part, reaching a threshold temperature value associated with the environment of the at least one incubator unit. The monitoring system may be further configured to provide the data to an external display. The mobile container may further comprise an outlet electrically coupled to the at least one power distribution portion, wherein the outlet may be configured to receive a power source external to the mobile container to provide power to the at least one incubator unit electrically coupled to the at least one power distribution portion. The mobile container may further comprise a switch electrically coupled to the at least one power distribution portion, wherein the switch may be configured to switch from the first power supply to a second power supply of the plurality of power supplies configured to provide power to the at least one incubator unit. The switch may be configured to automatically switch to the second power supply based upon, at least in part, a failure of the first power supply. The switch may be configured to automatically switch to the second power supply based upon, at least in part, the environment of the at least one incubator unit. The switch may be configured to manually switch to the second power supply. The mobile container may further comprise an insulated partition wall between the plurality of power supplies and the at least one power distribution portion. The mobile container may include a trailer.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
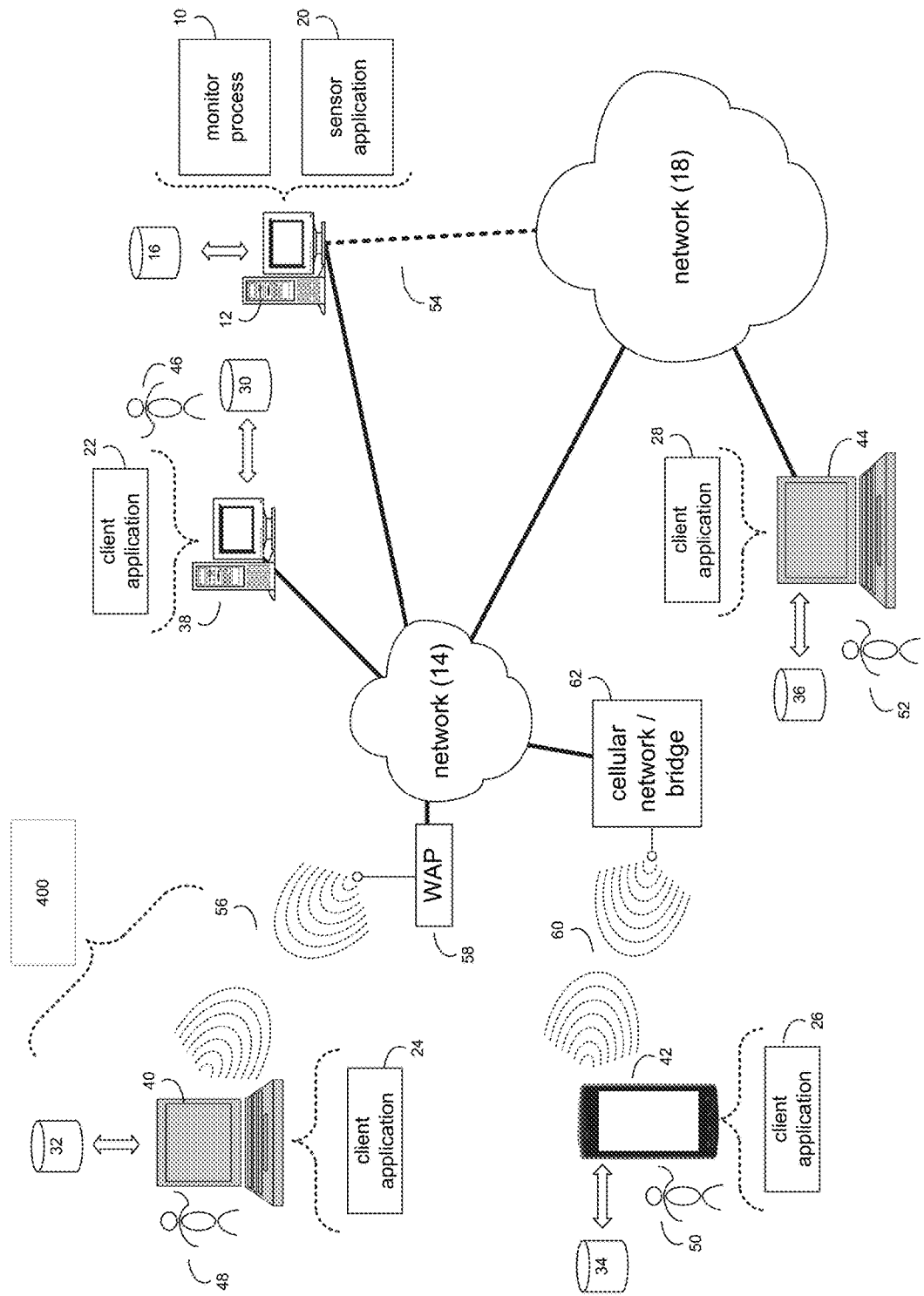
FIG. 1 is an example diagrammatic view of a monitor process coupled to an example distributed computing network according to one or more example implementations of the disclosure.

System Overview:

In some implementations, the present disclosure may be embodied as a method, system/apparatus, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module," "apparatus," or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, sensors, switches, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown monitor process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), a computing cloud(s), a sensor, a switch, and/or a generator or other computer controlled power supply (e.g., an Uninterruptible Power Supply (UPS)). In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a monitor process, such as monitor process 10 of FIG. 1, may monitor at least one of an environment of at least one freezer unit of one or more freezer units inside a mobile container (e.g., trailer 400) and a macro environment of the mobile container maintained by a refrigeration unit. Data of at least one of the macro environment of the mobile container and the environment of the at least one freezer unit may be logged. The data may be provided to an external display. An alert may be provided in real-time to the external display based upon, at least in part, at least one of the macro environment of the mobile container and the environment of the at least one freezer unit. A first power supply providing power to the at least one freezer unit may be switched to a second power supply providing power to the at least one freezer unit based upon, at least in part, at least one of the macro environment of the mobile container and the environment of the at least one freezer unit.

In some implementations, the instruction sets and subroutines of monitor process 10, which may be stored on storage device, such as storage device 16, coupled to computer 12, may be executed by one or more processors and one or more memory architectures included within computer 12. In some implementations, storage device 16 may include but is not limited to: a hard disk drive; a flash drive, a tape drive; an optical drive; a RAID array (or other array); a random access memory (RAM); and a read-only memory (ROM).

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML, database. In some implementations, any other form(s) of a data storage structure and/or organization may also be used. In some implementations, monitor process 10 may be a component of the data store, a stand-alone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a sensor application (e.g., sensor application 20), examples of which may include, but are not limited to, e.g., a temperature sensor application, a power sensor application, or other application that allows for environmental data sensing/monitoring and/or device operation status sensing. In some implementations, monitor process 10 and/or sensor application 20 may be accessed via one or more of client applications 22, 24, 26, 28. In some implementations, monitor process 10 may be a standalone application, or may be an applet/application/script/extension that may interact with and/or be executed within sensor application 20, a component of sensor application 20, and/or one or more of client applications 22, 24, 26, 28. In some implementations, sensor application 20 may be a standalone application, or may be an applet/application/script/extension that may interact with and/or be executed within monitor process 10, a component of monitor process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of monitor process 10 and/or sensor application 20. Examples of client applications 22, 24, 26, 28 may include, but are not limited to, e.g., a temperature sensor application, a power sensor application, or other application that allows for environmental data sensing/monitoring and/or device operation status sensing, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a media (e.g., video, photo, etc.) capturing device, a dedicated network device, a generator or other computer controlled power supply (e.g., an Uninterruptible Power Supply (UPS)), a sensor (e.g., temperature, power, etc.). Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of monitor process 10 (and vice versa). Accordingly, in some implementations, monitor process 10 may be a purely server-side application, a purely client-side application, or a hybrid server-side/client-side application that is cooperatively executed by one or more of client applications 22, 24, 26, 28 and/or monitor process 10.

In some implementations, one or more of client applications 22, 24, 26, 28 may be configured to effectuate some or all of the functionality of sensor application 20 (and vice versa). Accordingly, in some implementations, sensor application 20 may be a purely server-side application, a purely client-side application, or a hybrid server-side/client-side application that is cooperatively executed by one or more of client applications 22, 24, 26, 28 and/or sensor application 20. As one or more of client applications 22, 24, 26, 28, monitor process 10, and sensor application 20, taken singly or in any combination, may effectuate some or all of the same functionality, any description of effectuating such functionality via one or more of client applications 22, 24, 26, 28, monitor process 10, sensor application 20, or combination thereof, and any described interaction(s) between one or more of client applications 22, 24, 26, 28, monitor process 10, sensor application 20, or combination thereof to effectuate such functionality, should be taken as an example only and not to limit the scope of the disclosure.

In some implementations, one or more of users 46, 48, 50, 52 may access computer 12 and monitor process 10 (e.g., using one or more of client electronic devices 38, 40, 42, 44) directly through network 14 or through secondary network 18. Further, computer 12 may be connected to network 14 through secondary network 18, as illustrated with phantom link line 54. Monitor process 10 may include one or more user interfaces, such as browsers and textual or graphical user interfaces, through which users 46, 48, 50, 52 may access monitor process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
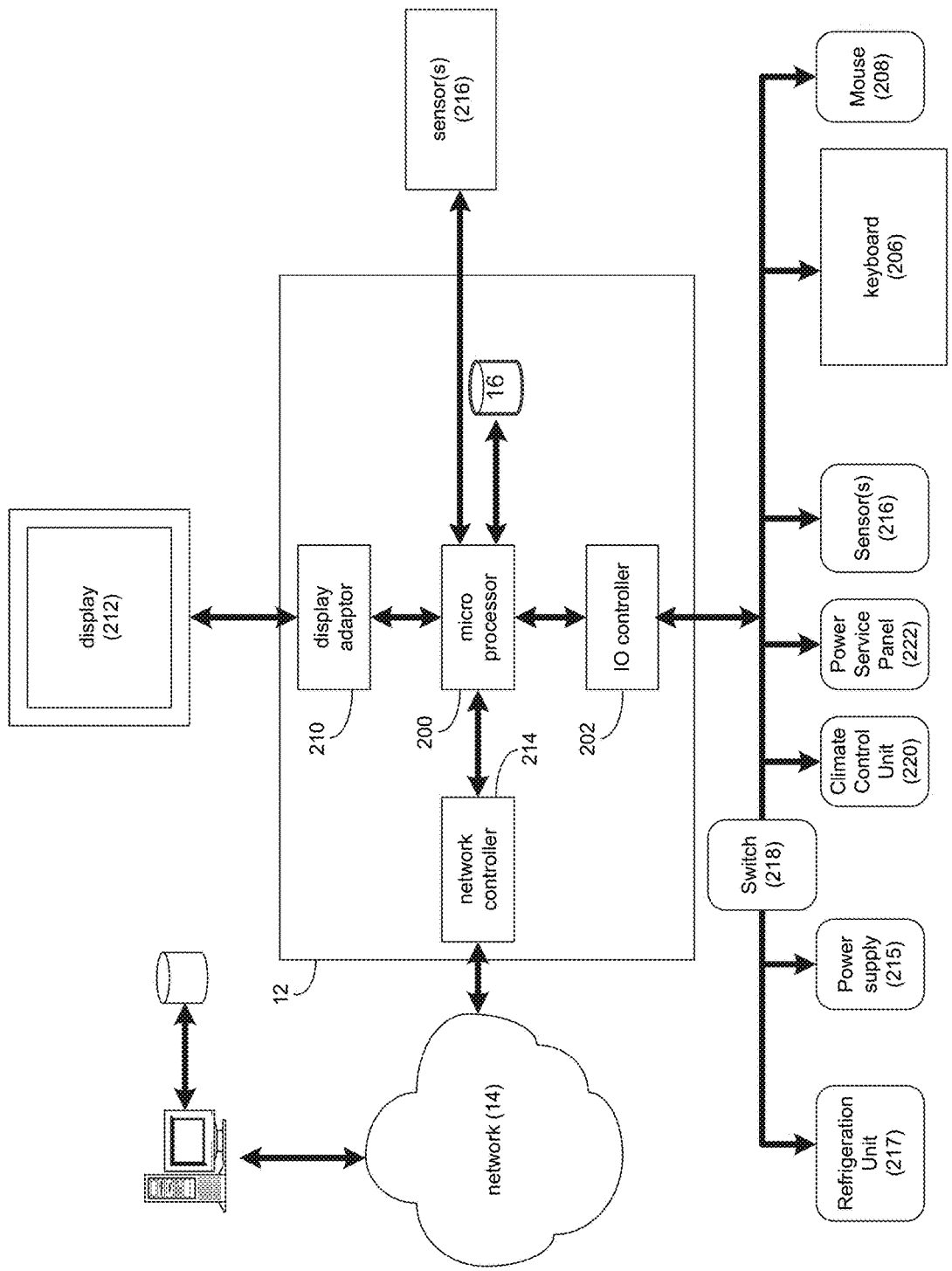
FIG. 2 is an example diagrammatic view of a client electronic device of FIG. 1 according to one or more example implementations of the disclosure.

Referring also to the example implementation of FIG. 2, there is shown a diagrammatic view of computer 12. While computer 12 is shown in this figure, this is for example purposes only and is not intended to be a limitation of this disclosure, as other configurations are possible. Additionally, any computing device capable of executing, in whole or in part, monitor process 10 (and/or sensor application 20) may be substituted for computer 12 (in whole or in part)

within FIG. 2, examples of which may include but are not limited to and/or one or more of client electronic devices 38, 40, 42, and 44.

In some implementations, computer 12 may include a processor (e.g., microprocessor 200) configured to, e.g., process data and execute the above-noted code/instruction sets and subroutines. Microprocessor 200 may be coupled via a storage adaptor to the above-noted storage device(s) (e.g., storage device 16). An I/O controller (e.g., I/O controller 202) may be configured to couple microprocessor 200 with various devices (e.g., via wired or wireless connection), such as keyboard 206, pointing/selecting device (e.g., touchpad, touchscreen, mouse 208, etc.), power supply (e.g., power supply 215), sensor(s) (e.g., sensor 216), refrigeration unit (e.g., refrigeration unit 217), switch (e.g., switch 218), climate control unit (e.g., climate control unit 220), power service panel (e.g., power service panel 222), USB ports, and printer ports. A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to the above-noted network 14 (e.g., the Internet or a local area network).

Generally, research (both clinical and basic scientific) may generate samples critical to discovery process. These samples may be both biological, chemical, or otherwise, and may require "freezer" storage at a particular facility. Freezers of various temperatures are generally the repositories for these samples in the facility. Temperatures may range from, e.g., −196 degrees centigrade to 60 degrees centigrade. Compliant with regulatory requirements, the sample microenvironment should generally remain within parameters and should generally be monitored for compliance. For example, to ensure regulatory compliance and integrity of the samples, stable monitored storage of these samples for, e.g., hours, days, months, years, may be beneficial. In some situations, the samples may be obtained at one location (e.g., the facility), and transported to another geographic location, e.g., for analysis or storage. Since the microenvironment needed to maintain the sample's integrity (as well as other regulatory requirements) may be sensitive, transportation of the freezer units (with the samples inside) may be best practice.

Generally, standard moving transportation vehicles may not be able to sustain the utility and environmental requirements for sample freezer storage (e.g., in a freezer unit). For example, temperature variations within the transport container (e.g., mobile trailer) may reach levels outside of the regulatory compliance range. In addition, non-powered sample freezers may not sustain regulatory compliance temperature ranges over long distances traveled without a power supply. As will be discussed in greater detail below, the disclosed transport/mobile container may sustain and provide regulatory macro environmental compliance of the container itself and/or the micro environmental compliance of the interior of the freezer unit holding the samples by, e.g., providing self-contained and/or redundant power, environment support system, and environment monitoring and recording for regulatory compliance and/or to alert users that may be transporting the samples in the freezer units to take action when changes in either the macro and/or micro environment are detected.

Figure 3:
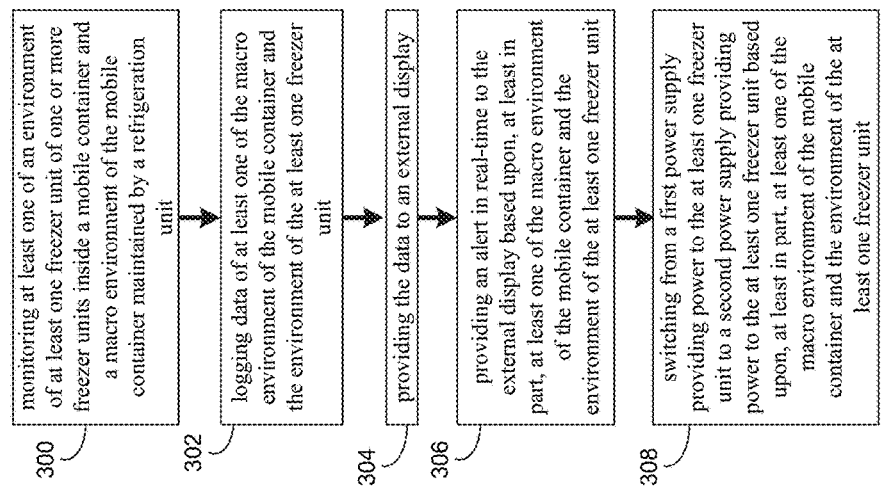
FIG. 3 is an example flowchart of a monitor process according to one or more example implementations of the disclosure.
Figure 4:
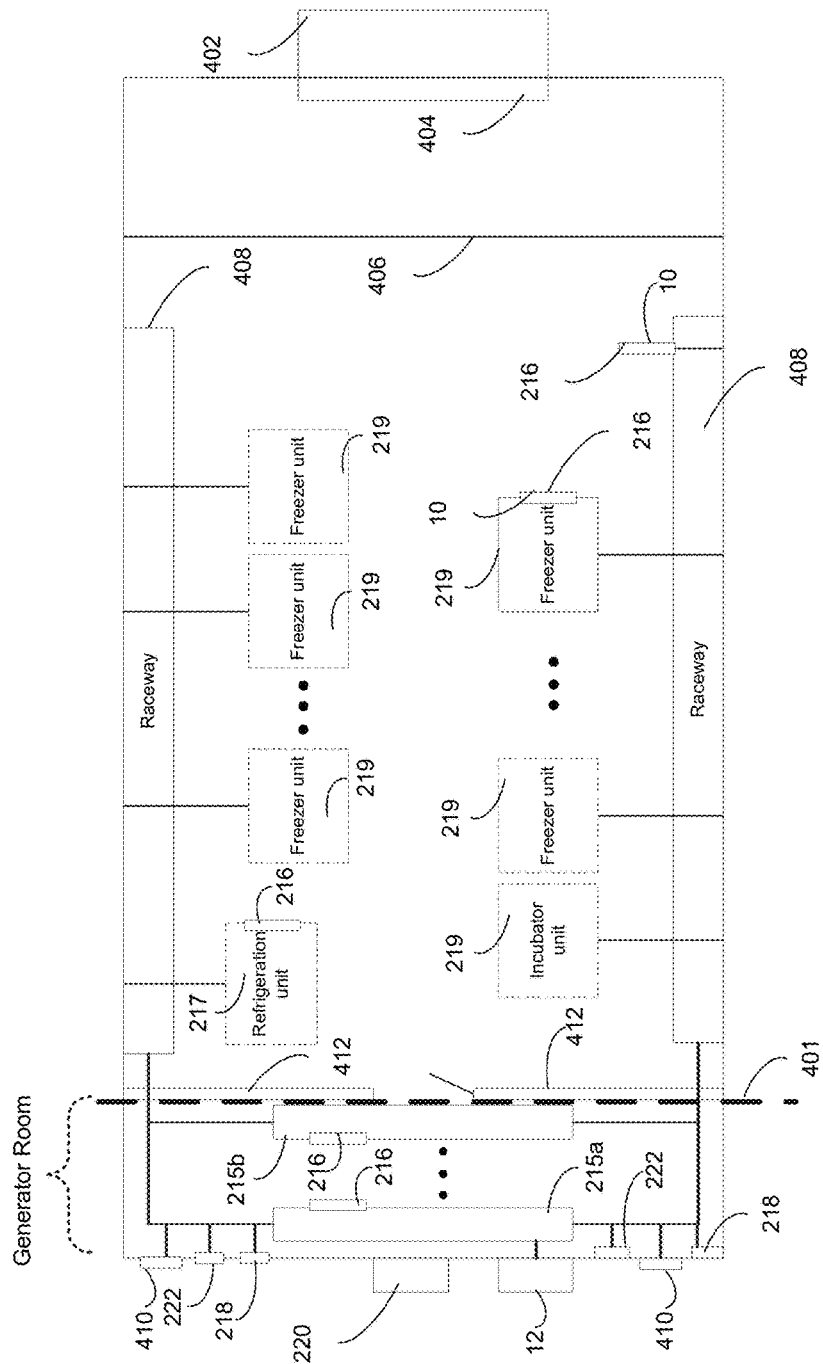
FIG. 4 is an example diagrammatic view of a mobile container used by a monitor process according to one or more example implementations of the disclosure.

The Monitor Process:

As discussed above and referring also at least to the example implementations of FIGS. 3-4, monitor process 10 may monitor 300 at least one of an environment of at least one freezer unit of one or more freezer units inside a mobile container and a macro environment of the mobile container maintained by a refrigeration unit. Monitor process 10 may log 302 data of at least one of the macro environment of the mobile container and the environment of the at least one freezer unit. Monitor process 10 may provide 304 the data to an external display. Monitor process 10 may provide 306 an alert in real-time to the external display based upon, at least in part, at least one of the macro environment of the mobile container and the environment of the at least one freezer unit. Monitor process 10 may switch 308 a first power supply providing power to the at least one freezer unit to a second power supply providing power to the at least one freezer unit based upon, at least in part, at least one of the macro environment of the mobile container and the environment of the at least one freezer unit.

Assume for example purposes only that, during a clinical study, patient tissue and blood samples are collected at a lab. Further assume that these samples are stored locally at the lab in one or more freezer units, each receiving power from a power source (e.g., a power outlet in the lab). The freezer units may be maintained typically at, e.g., −80 degrees centigrade for the sample's storage, according to, e.g., certain regulatory requirements set forth under the FDA. Further assume that, for various reasons, the freezer units (with the samples inside) are to be relocated to a different geographic location (e.g., to another lab in another building, town, state, etc.). As will be discussed in greater detail, the disclosed mobile container may accomplish that relocation while sustaining regulatory requirements for the samples.

For example, in some implementations, and referring at least to the example implementation of FIG. 4, the mobile container may include a trailer (e.g., trailer 400). In some implementations, trailer 400 may include, e.g., a standard regulatory compliant air-ride transport trailer in lengths of, e.g., 20' 36', 40' 45', 53', or other lengths. For instance, the trailer may satisfy the regulatory requirements of, e.g., Department of Transportation (DOT), International Organization for Standardization (ISO), etc. In certain implementations, trailer 400 may be manufactured with the example components disclosed herein, or may be modified post manufacture to incorporate the example components disclosed herein. It will be appreciated that non-standard transport trailers and transport trailers with differing dimensions (e.g., width, length, etc.), differing locations of components, differing number of components, differing interconnection of components, etc. may also be used without departing from the scope of the disclosure. As such, the specific design of trailer 400 shown via FIG. 4 should be taken as example only and not to otherwise limit the scope of the disclosure. Additionally, while the examples provided in the disclosure use a trailer as the mobile container, it will be appreciated that any type of mobile/transportable (e.g., via truck, rail, ship, air, etc.) container capable of obtaining the example and non-limiting benefits of the present disclosure may be used without departing from the scope of the disclosure. As such, the use of trailer 400 as the mobile container should be taken as example only, and not to otherwise limit the scope of the disclosure. Furthermore, it will be appreciated that the present disclosure may be used with non-regulatory compliant implementations, where such regulations may be less stringent or non-existent. Even furthermore, straight trucks may be used that may have box lengths from, e.g., 10 feet to 30 feet, or other lengths. Moreover, trailer 400 may be a single trailer or multiple trailers in tandem connected by an umbilical cable. For instance, the dashed line (e.g., dashed line 401) shows an example location where trailer 400 may actually be configured as, e.g., two tandem trailers, where the left side of dashed line 401 may be a tandem trailer that may include one or more of the components described throughout (e.g., generator, refrigerator unit, humidity chambers, etc.). As such, the description of trailer 400 as a single trailer should be taken as example only and not to otherwise limit the scope of the disclosure.

Assume for example purposes only that for regulatory compliance and/or operational reasons, the above-noted samples within the regulatory complaint freezer units may be maintained in place by, e.g., double logistics straps secured to a rubber bumper attached to trailer 400 for airflow. In some implementations, with the freezer units containing the samples during relocation may be initially loaded on a self-leveling lift gate (e.g., lift gate 402) proximate a trailer door (e.g., rollup trailer door 404). In some implementations, lift gate 402 may be a, e.g., 4500-5000 lbs. self-leveling lift gate installed on the rear of trailer 400 (or elsewhere) preventing the samples inside the freezer units from being disturbed.

In some implementations, trailer 400 may include an airlock separate curtain (e.g., airlock curtain 406), which may be a plastic material or other appropriate material. In some implementations, airlock curtain 406 may be located just past rollup trailer door 404 to provide an airlock between the outside and the interior of the trailer environment(s) supporting stable temperature control. Fire extinguishers may be located in trailer 400, e.g., inside a generator room housing one or more generators, as well as the rear of the trailer compartment.

In some implementations, the mobile container may include at least one power distribution portion. For example, trailer 400 may include a power distribution portion (e.g., raceway 408), that may be used to help provide power to the individual freezer units sustaining the microenvironment for the samples. In some implementations, raceway 408 may generally be described without limitation as an enclosed conduit that may form a physical pathway for electrical wiring, and may protect wires and cables from heat, humidity, corrosion, water intrusion and general physical threats. In the example implementation, raceway 408 may be mounted, e.g., on each sidewall of the interior of trailer 400. As will be discussed below, the internal trailer power may be distributed via raceway 408, e.g., in 60-220 amp service, such as 110 and 220 amp circuits (or otherwise) depending on the individual freezer units' power requirements.

In some implementations, the mobile container may further include a plurality of power supplies electrically coupled to the at least one power distribution portion, wherein a first power supply of the plurality of power supplies may be configured to provide power to at least one freezer unit of one or more freezer units electrically coupled to the at least one power distribution portion. For instance, assume for example purposes only that a freezer unit (e.g., freezer unit 219) contains the above-noted samples. In the example, freezer unit 219 may be electrically connected to raceway 408, similarly to how freezer unit 219 may be connected to a wall outlet in the lab (e.g., two prong plug, three prong plug, or any other configuration dependent upon the connecting equipment requirement). A power supply (e.g., power supply 215) may include one or more generators (e.g., generator 215a and generator 215b) that may be located in, e.g., the front interior compartment of trailer 400, and may be electrically coupled to raceway 408. During transport (or at rest), when at least one of the generators is running, it may provide the necessary power to run freezer unit 219 (and/or any other freezer units) via raceway 408. In some implementations, generator 215a and generator 215b may be independent (e.g., 40 KW) generators with an independent 110-gallon diesel fuel tank (or other sized tank with other fuel types). However, it will be appreciated that each generator may be sized differently depending on such things as the required energy to power the total freezer unit power load (e.g., one or more freezer units simultaneously connected to raceway 408). In some implementations, as will be discussed below, generator 215a may be the primary generator powering the freezer unit power load, and generator 215b may be a full redundant backup should generator 215a fail. While only two generators are shown via FIG. 4, more or less generators may also be used without departing from the scope of the disclosure. In some implementations, generator 215a and/or generator 215b may be electrically coupled their own respective raceway, or both raceways.

While power supply 215 is described as generator 215a/215b, it will be appreciated that other types of power supplies may also be used without departing from the scope of the disclosure. For example, power supply 215 may include, e.g., an energy storage device such as a battery/fuel cell, a solar powered energy storage device, an electric generator, an Uninterruptible Power Supply (UPS), liquid propane, or any other type of device/method capable of supplying power to a load for use with the present disclosure. As such, the example of using a generator should be taken as example only and not to otherwise limit the scope of the disclosure.

In some implementations, the mobile container may further comprise an outlet electrically coupled to the at least one power distribution portion, wherein the outlet may be configured to receive a power source external to the mobile container to provide power to the at least one freezer unit electrically coupled to the at least one power distribution portion. For instance, assume for example purposes only that trailer 400 is at the lab location loading freezer unit 219 to be coupled to raceway 408. In the example, trailer 400 may be at rest and may not require use of its generators to power freezer unit 219. For example, in some implementations, trailer 400 may include an outlet (e.g., outlet 410) electrically coupled to raceway 408, where outlet 410 may be configured to receive power (e.g., shore power) via a connection to permanent building power. Thus, in the example, while trailer 400 is not mobile (and/or engines shut down), the trailer power may still be provided to freezer unit 219 through the building connection to outlet 410. In some implementations, trailer 400 may be equipped with one or more, e.g., two, 200 amp electrical service outlets (or other sized electrical service outlets) for connection to permanent building power. In some implementations, outlet 410 may be located on, e.g., the front exterior of the trailer or elsewhere. When trailer 400 is ready to begin traveling (and/or upon disconnecting building power from outlet 410), power to freezer unit 219 may be transferred from building power to the generator(s), thereby saving money, time, and reducing pollution by limiting use of the generators. In some implementations, the transfer of power may be a manual process using, e.g., a power transfer switch, such as switch 218. In some implementations, switching 308 the transfer of power to/from building power may be an automated process upon the detection by monitor process 10 of connecting/disconnecting building power to outlet 410 and/or detecting that trailer 400 is no longer receiving external building power via outlet 410 (e.g., using voltage monitoring circuitry or other known technique).

In some implementations, the mobile container may further comprise an insulated partition wall between the plurality of power supplies and the at least one power distribution portion. For instance, trailer 400 may include one or more insulated partition walls (e.g., partition walls 412) between generators 215a/215b, which may include a welded aluminum (or other material) insulated wall panel system with a sealed access fire rated door. In some implementations, one or more intake grates may be fabricated into the partition walls or elsewhere, which may allow for constant air return to the thermostat to monitor 300 temperature and the operation of the refrigerator unit and/or the macro environment of trailer 400.

In some implementations, trailer 400 may include Light Emitting Diode (LED) lighting (or other lighting types) that may help ensure a safe work area. In some implementations, trailer 400 may include seamless internal surfaces for compliance with Good Manufacturing Procedures (GMP), and may further include surfaces compatible for all biosecurity decontamination or sustainment treatments, such as sanitization or disinfection.

In some implementations, trailer 400 may include a refrigeration unit (e.g., refrigeration unit 217). For example, the interior macro environment of trailer 400 (as opposed to the microenvironment of the freezer units holding the samples) may be sustained through, e.g., a 3350 CFM airflow refrigeration unit mounted on, e.g., the exterior front of the trailer, or other sized refrigeration unit depending on requirements. In some implementations, the interior temperature (interior macro environment of trailer 400) may be regulated through a climate control unit (e.g., thermostat/climate control unit 220) located on refrigeration unit 217 or in a cabin of trailer 400, which may be manually/automatically adjusted via monitor process 10 and climate control unit 220.

In some implementations, trailer 400 may include a power service panel (e.g., power service panel 222), which may generally be described in a non-limiting manner as a component of an electricity supply system that may divide an electrical power feed (e.g., via outlet 410, generator 215a/215b, or combination thereof) into subsidiary circuits, while providing a protective fuse or circuit breaker for each circuit in a common enclosure.

In some implementations, trailer 400 may include one or more air intake louvers with filters (e.g., HEPA filters), which may be installed, e.g., in the sidewall of trailer 400 to provide fresh airflow for generator operation. In some implementations, trailer 400 may include a return air exhaust system for heat load control, which may include one or more airflow chutes installed, e.g., in the ceiling or elsewhere so that the airflow will not short cycle. A supply air distribution system may also be installed for even temperature control for the macro environment of trailer 400. In some implementations, a sensor (e.g., sensor 216) may include an oxygen sensor configured to determine air quality control. Sensor 216 may include other types of sensors as well, including, e.g., temperature, humidity, $CO_2$, power, functional status, etc.

In some implementations, the mobile container may further include a monitoring system configured to monitor 300 an environment of the at least one freezer unit of the one or more freezer units. For example, trailer 400 may include a monitoring system (e.g., via monitor process 10) that may monitor 300 the micro environment (e.g., temperature, humidity, $CO_2$, $O_2$, power, functional status, etc.) of freezer unit 219 containing the samples.

Similarly, in some implementations, the monitoring system may be further configured to monitor 300 a macro environment of the mobile container maintained by the refrigeration unit. For example, the monitoring system (via monitor process 10) may monitor 300 the macro environment of trailer 400 and any of the components included in trailer 400 (e.g., temperature, humidity, $CO_2$, $O_2$, power, functional status of refrigeration unit 217, raceway, etc.).

In some implementations, an independent wireless and/or wired equipment monitoring system (executed via monitor process 10) may be installed in trailer 400. At least a portion of the circuitry of the monitoring system may be coupled to raceway 408, coupled to a monitoring box, and/or inserted into freezer unit 219 and/or refrigerator unit 217. In some implementations, the monitoring system may include sensor 216, which may include some features of monitor process 10 described throughout. In some implementations, sensor 216 may include a temperature sensor (e.g., thermocouple, described generally without limitation as a thermoelectric device for measuring temperature, including two wires of different metals connected at two points, where a voltage developed between the two wire junctions may be measured in proportion to the temperature difference). In some implementations, the thermocouple may include, e.g., a "base metal" thermocouple, "noble metal" thermocouple, or other type of temperature reading sensor.

In some implementations, the monitoring system (e.g., via monitor process 10) may be further configured to log 302 data of at least one of the macro environment of the mobile container and the environment of the at least one freezer unit. For example, temperature data (or other types of data gathered via sensor 216, including a log of automatic/manual changes made to the temperature via climate control unit 220) for the macro environment of trailer 400 and/or the microenvironment of freezer unit 219 may be logged 302 (recorded). In some implementations, the data may be stored locally via the above-noted storage device of computer 12. In some implementations, the data may be wirelessly transmitted (e.g., via network 14) by monitor process 10 to a remote data storage device e.g., at an office via client electronic device 38. The data may be retained for a predetermined amount of time, and may be retained indefinitely (e.g., in the case of an audit or customer loss of printouts that may be provided each trip). In some implementations, monitor process 10 may provide the data for regulatory compliance.

In some implementations, the monitoring system may be further configured to provide 304 the data to an external display. For example, throughout the occupancy of freezer unit 219 being within trailer 400, monitor process 10 may monitor 300 the micro and macro environments, where the data (e.g., temperature data) from the thermocouple may be polled in real-time from one or more of the freezer units and/or the macro environment refrigeration unit, or may be polled periodically at an example predetermined rate of, e.g., 3 minutes. In the example, the data may be provided 304 (wirelessly or via a physical connection) by monitor process 10 to, e.g., a receiver that may be located in the generator compartment, and/or to an external display 212 of computer 12 that may be located in the cabin portion of trailer 400.

In some implementations, the environmental monitoring system of trailer 400 may be validated and calibrated, e.g., annually, for regulatory compliance through a validation test plan and acceptance criteria. The validation test plan and acceptance criteria may be defined through a validation protocol, which may include operator and support technician Good Laboratory Practice (GLP) training and/or Good Manufacturing Practice (GMP) certified technicians with records, internal quality assurance monitoring, external quality assurance auditing for sustained compliance, trailer maintenance log and change control documentation, and/or live and archived environmental storage of the data for compliance records.

In some implementations, the monitoring system may be further configured to provide 306 an alert in real-time to an external display based upon, at least in part, reaching a threshold temperature value associated with the environment of the at least one freezer unit. For instance, assume for example purposes only that freezer unit 219 is required to be maintained at −60 degrees centigrade. Further assume that monitor process 10 has been pre-programmed (e.g., via a graphical user interface associated with monitor process 10) to provide 306 an alert if the temperature of freezer unit 219 is more than, e.g., plus/minus 2 degrees centigrade. In the example, assume that an hour after trailer 400 is on its way to deliver the samples, the temperature of freezer unit 219 is determined by sensor 216 (e.g., via monitor process 10) to be −58 degrees centigrade. In the example, monitor process 10 may determine that the threshold temperature value for freezer unit 219 has been reached, and may provide 306 an alert to the driver of trailer 400. For instance, an alert may be provided 306 to computer 12 via display 212 with a message indicating the threshold temperature value for freezer unit 219 has been reached, such that a user may take remedial actions where available (discussed below). In some implementations, the alert may be a pop-up window, text message, email, or other form of alert (e.g., audible). In some implementations, the alert may be provided 306 via a visual indication, such as, e.g., changing the color of display 212 of computer 12, flashing one or more lights mounted on the inside a tractor cabin or on the outside of trailer 400. The type of alert that is provided may be a default alert, and/or may be pre-programmed (e.g., via a graphical user interface associated with monitor process 10) with the desired alert types. Other forms of alerts, or combinations of alerts, may be provided without departing from the scope of the disclosure.

In some implementations, the monitoring system may be further configured to provide 306 an alert in real-time to an external display based upon, at least in part, reaching a threshold temperature value associated with the macro environment of trailer 400. For instance, assume for example purposes only that the macro environment of trailer 400 is required to be maintained at −10 degrees centigrade. Further assume that monitor process 10 has been pre-programmed (e.g., via a graphical user interface associated with monitor process 10) to provide 306 an alert if the temperature of the macro environment is more than, e.g., plus/minus 3 degrees centigrade. In the example, assume that an hour after trailer 400 is on its way to deliver the samples, the temperature of the macro environment is determined by sensor 216 (e.g., via monitor process 10) to be −7 degrees centigrade. In the example, monitor process 10 may determine that the threshold temperature value for the macro environment has been reached, and may provide 306 an alert to the driver of trailer 400, similarly to the alerts discussed above, such that a user may take remedial actions where available.

In some implementations, the mobile container may further comprise a switch electrically coupled to the at least one power distribution portion, wherein the switch may be configured to switch 308 from the first power supply to a second power supply of the plurality of power supplies configured to provide power to the at least one freezer unit. For example, at any given time, switch 218 may be used to switch 308 power from generator 215a to generator 215b, such that generator 215b would be providing power to freezer unit 219 instead of generator 215a. In some implementations, switch 218 may be used to switch 308 power from being provided by generator 215a to refrigeration unit 217 to one or more backup refrigeration units (e.g., upon failure of refrigeration unit 217). In some implementations, switch 218 may be used to switch 308 power from generator 215a to generator 215b, such that generator 215b would be providing power to refrigerator unit 217 instead of generator 215a.

In some implementations, the switch may be configured to automatically switch 308 to the second power supply based upon, at least in part, a failure of the first power supply. For instance, assume for example purposes only that sensor 216 includes a voltage sensor, which may be used by monitor process 10 to determine that generator 215a (currently supplying power to freezer unit 219) has failed or is malfunctioning. In the example, upon detecting that generator 215a has failed or is malfunctioning, monitor process 10 (e.g., via switch 218) automatically switch 308 to having generator 215b supply power to freezer unit 219. Thus, in the example, monitor process 10 may provide an automatic and seamless remedial action of switching the power sources in the event of failure, which may reduce the chances that the micro environment of freezer unit 219 goes out of range and/or reduce the time that the micro environment of freezer unit 219 goes out of range.

In some implementations, the switch may be configured to automatically switch 308 to the second power supply based upon, at least in part, the environment of the at least one freezer unit. For instance, and continuing with the above example where monitor process 10 determines that the threshold temperature value for freezer unit 219 has been reached, further assume that the threshold temperature value for freezer unit 219 has been reached due to a failure or malfunction of generator 215a, which is therefore no longer providing adequate power to freezer unit 219. In the example, monitor process 10 may not necessarily be aware that the threshold temperature value for freezer unit 219 has been reached due to a failure or malfunction of generator 215a, and as a precautionary remedial step, may automatically switch 308 to having generator 215b supply power to freezer unit 219 instead of generator 215a. In some implementations, should it be determined that the threshold temperature value for freezer unit 219 has been reached due to a failure of freezer unit 219 (as opposed to a failure of generator 215a), the above-noted alert may provide adequate notice to enable the user to move the samples to another backup freezer unit.

In some implementations, the switch may be configured to manually switch 308 to the second power supply. For example, switch 218 may enable a user to manually switch 308 to having generator 215b supply power to freezer unit 219 instead of generator 215a (and vice versa). As such, the example of an automated switch should be taken as example only and not to otherwise limit the scope of the disclosure.

While one or more examples of the disclosure refer to trailer 400 having freezer units (via refrigeration), it will be appreciated that other types of units may be used. For example, an incubator may be used in addition to or in place of a freezer unit. In some implementations, the incubator may be capable of maintaining the necessary optimal micro environment, and may include temperature control via heating, and/or dual heating and cooling features. As such, freezer units and incubator units may be used interchangeably where the context is appropriate, and the use of freezer units should be taken as example only and not to otherwise limit the scope of the disclosure. Additionally, in some implementations, trailer 400 may be used as the cooler without plugging in any freezer units. For instance, trailer 400 may be the micro environment rather than inside the freezer unit. In this example, the temperature ranges may generally be, e.g., 2 degrees centigrade-8 degrees centigrade or minus 20 degrees centigrade.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. An apparatus comprising:
   a mobile container including:
   at least one power distribution portion coupled to the mobile container;
   a plurality of power supplies electrically coupled to the at least one power distribution portion, wherein a first power supply of the plurality of power supplies is configured to provide power to at least one freezer unit of one or more freezer units inside the mobile container and electrically coupled to the at least one power distribution portion;
   a monitoring system including one or more environmental sensors and one or more processors configured to monitor a micro environment of the at least one freezer unit of the one or more freezer units;
   an outlet electrically coupled to the at least one power distribution portion, wherein the outlet is configured to receive shore power from a source external to the mobile container to provide power to the at least one freezer unit electrically coupled to the at least one power distribution portion; and
   a switch electrically coupled to the at least one power distribution portion, wherein the switch is configured to switch from the first power supply to a second power supply of the plurality of power supplies configured to provide power to the at least one freezer unit, wherein the switch is configured to automatically switch to the second power supply based upon, at least in part, the micro environment of the at least one freezer unit.

2. The apparatus of claim 1 wherein the monitoring system is further configured to monitor a macro environment of the mobile container maintained by a refrigeration unit.

3. The apparatus of claim 2 wherein the monitoring system is further configured to log data of at least one of the macro environment of the mobile container and the micro environment of the at least one freezer unit.

4. The apparatus of claim 3 wherein the monitoring system is further configured to provide an alert in real-time to an external display based upon, at least in part, reaching a threshold temperature value associated with the micro environment of the at least one freezer unit.

5. The apparatus of claim 3 wherein the monitoring system is further configured to provide the data to an external display.

6. The apparatus of claim 1 wherein the switch is further configured to automatically switch to the second power supply based upon, at least in part, a failure of the first power supply.

7. The apparatus of claim 1 wherein the switch is further configured to manually switch to the second power supply.

8. The apparatus of claim 1 further comprising an insulated partition wall between the plurality of power supplies and the at least one power distribution portion.

9. The apparatus of claim 1 wherein the mobile container includes one of a trailer container, a rail container, a ship container, and an air container.

10. An apparatus comprising:
    a mobile container including:
    at least one power distribution portion coupled to the mobile container;
    a plurality of power supplies electrically coupled to the at least one power distribution portion, wherein a first power supply of the plurality of power supplies is configured to provide power to at least one freezer unit of one or more freezer units inside the mobile container and electrically coupled to the at least one power distribution portion;
    a monitoring system including one or more environmental sensors and one or more processors configured to monitor a micro environment of the at least one freezer unit, wherein the monitoring system is further configured to log data of the micro environment of the at least one freezer unit, and wherein the monitoring system is further configured to provide an alert in real-time to an external display based upon, at least in part, reaching a threshold temperature value associated with the micro environment of the at least one freezer unit;
    an outlet electrically coupled to the at least one power distribution portion, wherein the outlet is configured to receive shore power from a source external to the mobile container to provide power to the at least one freezer unit electrically coupled to the at least one power distribution portion; and a switch electrically coupled to the at least one power distribution portion, wherein the switch is configured to switch from the first power supply to a second power supply of the plurality of power supplies configured to provide power to the at least one freezer unit, wherein the switch is configured to automatically switch to the second power supply based upon, at least in part, the micro environment of the at least one freezer unit.

11. The apparatus of claim 10 wherein the monitoring system is further configured to monitor a macro environment of the mobile container maintained by a refrigeration unit.

12. The apparatus of claim 11 wherein the monitoring system is further configured to log data of the macro environment of the mobile container.

13. The apparatus of claim 12 wherein the monitoring system is further configured to provide the data of the macro environment of the mobile container and the data of the micro environment of the at least one freezer unit to the external display.

14. The apparatus of claim 10 wherein the switch is further configured to automatically switch to the second power supply based upon, at least in part, at least one of a failure of the first power supply and the micro environment of the at least one freezer unit.

15. The apparatus of claim 10 wherein the mobile container includes a one of a trailer container, a rail container, a ship container, and an air container.

16. A computing system including one or more processors and one or more memories configured to perform operations comprising:
monitoring at least one of a micro environment of at least one freezer unit of one or more freezer units inside a mobile container and a macro environment of the mobile container maintained by a refrigeration unit;
logging data of at least one of the macro environment of the mobile container and the environment of the at least one freezer unit;
providing the data to an external display;
providing an alert in real-time to the external display based upon, at least in part, at least one of the macro environment of the mobile container and the environment of the at least one freezer unit;
switching from a first power supply providing power to the at least one freezer unit through at least one power distribution portion coupled to the mobile container to a second power supply providing power to the at least one freezer unit through the at least one power distribution portion based upon, at least in part, at least one of the macro environment of the mobile container and the micro environment of the at least one freezer unit; and
receiving, by an outlet electrically coupled to the at least one power distribution portion, shore power from a source external to the mobile container to provide power to the at least one freezer unit electrically coupled to the at least one power distribution portion.

17. An apparatus comprising:
a mobile container including:
at least one power distribution portion coupled to the mobile container;
a plurality of power supplies electrically coupled to the at least one power distribution portion, wherein a first power supply of the plurality of power supplies is configured to provide power to at least one incubator unit of one or more incubator units inside the mobile container and electrically coupled to the at least one power distribution portion;
a monitoring system including one or more environmental sensors and one or more processors configured to monitor a micro environment of the at least one incubator unit of the one or more incubator units;
an outlet electrically coupled to the at least one power distribution portion, wherein the outlet is configured to receive shore power from a source external to the mobile container to provide power to the at least one incubator unit electrically coupled to the at least one power distribution portion; and
a switch electrically coupled to the at least one power distribution portion, wherein the switch is configured to switch from the first power supply to a second power supply of the plurality of power supplies configured to provide power to the at least one incubator unit, wherein the switch is configured to automatically switch to the second power supply based upon, at least in part, the micro environment of the at least one incubator unit.

* * * * *